US011722363B2

(12) United States Patent
Kou et al.

(10) Patent No.: US 11,722,363 B2
(45) Date of Patent: Aug. 8, 2023

(54) EXCHANGE MANAGEMENT APPARATUS, EXCHANGE MANAGEMENT METHOD, AND PROGRAM

(71) Applicant: NIPPON TELEGRAPH AND TELEPHONE CORPORATION, Tokyo (JP)

(72) Inventors: Sei Kou, Musashino (JP); Tomoya Hatano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/623,953

(22) PCT Filed: Jul. 1, 2019

(86) PCT No.: PCT/JP2019/026087
§ 371 (c)(1),
(2) Date: Dec. 30, 2021

(87) PCT Pub. No.: WO2021/001880
PCT Pub. Date: Jan. 7, 2021

(65) Prior Publication Data
US 2022/0368588 A1   Nov. 17, 2022

(51) Int. Cl.
*H04L 41/0668*   (2022.01)
*H04L 49/00*   (2022.01)

(52) U.S. Cl.
CPC .......... *H04L 41/0668* (2013.01); *H04L 49/30* (2013.01)

(58) Field of Classification Search
CPC . H04L 41/0668; H04L 49/30; H04L 43/0876; H04L 12/44; H04L 41/12
See application file for complete search history.

(56) References Cited

U.S. PATENT DOCUMENTS

2013/0229910 A1\*   9/2013   McKnight, Jr. ....... H04W 24/04
370/255

FOREIGN PATENT DOCUMENTS

| JP | 2009529295 A | \* | 8/2009 |
| JP | 5949035 B2 | | 7/2016 |

\* cited by examiner

*Primary Examiner* — Matthew M Kim
*Assistant Examiner* — Kyle Emanuele
(74) *Attorney, Agent, or Firm* — Harness, Dickey & Pierce, P.L.C.

(57) ABSTRACT

A replacement management apparatus includes a detection unit configured to detect, for both a communication apparatus to be replaced and a communication apparatus for replacement, communication speeds of physical ports used for connection, in units of communication apparatuses that are connection destinations, and a replacement determination unit configured to derive, for both the communication apparatus to be replaced and the communication apparatus for replacement, a communication capacity that is a sum of the communication speeds for each of the communication apparatuses that are connection destinations, and determine, for all of the communication apparatuses that are connection destinations, in a case in which the communication capacity of the communication apparatus for replacement is equal to or greater than the communication capacity of the communication apparatus to be replaced, that the communication apparatus to be replaced is replaceable with the communication apparatus for replacement.

3 Claims, 15 Drawing Sheets

| COMMUNICATION APPARATUS | COMMUNICATION APPARATUS PORT NUMBER | CONNECTION DESTINATION APPARATUS | CONNECTION DESTINATION APPARATUS PORT NUMBER |
|---|---|---|---|
| FIRST COMMUNICATION APPARATUS | A-6 | SECOND COMMUNICATION APPARATUS | B-1 |
| | A-7 | SECOND COMMUNICATION APPARATUS | B-2 |
| SECOND COMMUNICATION APPARATUS | B-1 | FIRST COMMUNICATION APPARATUS | A-6 |
| | B-2 | FIRST COMMUNICATION APPARATUS | A-7 |
| | B-6 | THIRD COMMUNICATION APPARATUS | C-1 |
| | B-7 | THIRD COMMUNICATION APPARATUS | C-2 |
| THIRD COMMUNICATION APPARATUS | C-1 | SECOND COMMUNICATION APPARATUS | B-6 |
| | C-2 | SECOND COMMUNICATION APPARATUS | B-7 |

FIG. 4

| COMMUNICATION APPARATUS | COMMUNICATION APPARATUS PORT NUMBER | CONNECTION DESTINATION APPARATUS | CONNECTION DESTINATION APPARATUS PORT NUMBER |
|---|---|---|---|
| FIRST COMMUNICATION APPARATUS | A-9 | FOURTH COMMUNICATION APPARATUS | D-4 |
| | A-10 | FOURTH COMMUNICATION APPARATUS | D-5 |
| THIRD COMMUNICATION APPARATUS | C-3 | FOURTH COMMUNICATION APPARATUS | D-7 |
| | C-4 | FOURTH COMMUNICATION APPARATUS | D-8 |
| FOURTH COMMUNICATION APPARATUS | D-4 | FIRST COMMUNICATION APPARATUS | A-9 |
| | D-5 | FIRST COMMUNICATION APPARATUS | A-10 |
| | D-7 | THIRD COMMUNICATION APPARATUS | C-3 |
| | D-8 | THIRD COMMUNICATION APPARATUS | C-4 |

FIG. 5

| COMMUNICATION APPARATUS | COMMUNICATION APPARATUS PORT NUMBER | COMMUNICATION SPEED |
|---|---|---|
| FIRST COMMUNICATION APPARATUS | A-6 | 10Gbps |
| | A-7 | 10Gbps |
| SECOND COMMUNICATION APPARATUS | B-1 | 10Gbps |
| | B-2 | 10Gbps |
| | B-6 | 10Gbps |
| | B-7 | 10Gbps |
| THIRD COMMUNICATION APPARATUS | C-1 | 10Gbps |
| | C-2 | 10Gbps |

FIG. 6

| COMMUNICATION APPARATUS | COMMUNICATION APPARATUS PORT NUMBER | COMMUNICATION SPEED |
|---|---|---|
| FIRST COMMUNICATION APPARATUS | A-9 | 10Gbps |
| | A-10 | 10Gbps |
| SECOND COMMUNICATION APPARATUS | C-3 | 10Gbps |
| | C-4 | 10Gbps |
| FOURTH COMMUNICATION APPARATUS | D-4 | 10Gbps |
| | D-5 | 10Gbps |
| | D-7 | 10Gbps |
| | D-8 | 10Gbps |

FIG. 7

EXCHANGE MANAGEMENT APPARATUS, EXCHANGE MANAGEMENT METHOD, AND PROGRAM

CROSS-REFERENCE TO RELATED APPLICATIONS

This application is a 371 U.S. National Phase of International Application No. PCT/JP2019/026087 filed on Jul. 1, 2019. The entire disclosure of the above application is incorporated herein by reference.

TECHNICAL FIELD

The present disclosure relates to a replacement management apparatus, a replacement management method, and a program.

BACKGROUND ART

Communication apparatuses may be replaced for certain reasons such as migration to next generation networks, failure of a communication apparatus, and the life-span of a communication apparatus. At sites of the replacement, communication apparatuses to be replaced and communication apparatuses that are connection destinations are connected in predetermined wiring patterns using cables connected to ports. In a case in which a communication apparatus to be replaced causes a failure, each of cables connected to the communication apparatus to be replaced is detached from each of ports of the communication apparatus to be replaced by an operator at a site. In a case in which a sum (hereinafter, referred to as a "communication capacity") of communication speeds of the ports is the same for the communication apparatus to be replaced and a communication apparatus for replacement, the communication apparatus for replacement is connected to a different communication apparatus (connection destination) using the same number of cables as that of the cables connected from the different communication apparatus (connection destination) to the communication apparatus to be replaced.

In a case in which communication capacities are different between the communication apparatus to be replaced and the communication apparatus for replacement, the communication apparatus for replacement is connected to the different communication apparatus using a different number of cables from that of the cables connected from the different communication apparatus to the communication apparatus to be replaced. Communication traffic is thus aggregated or disaggregated (see Patent Literature 1).

CITATION LIST

Patent Literature

Patent Literature 1: JP 5949035 B

SUMMARY OF THE INVENTION

Technical Problem

However, in a case in which communication apparatuses having the same communication capacity have ports with different communication speeds to each other and the communication apparatuses are replaced with each other, it may not be possible to determine, using apparatuses in the related art, whether a condition regarding the number of cables to connect the communication apparatuses is met after the replacement. Also, in a case in which communication apparatuses having different communication capacities are replaced, it may not be possible to determine, by the apparatuses in the related art, whether a condition regarding communication capacities is met after the replacement.

In this manner, it may not be possible to determine, by the apparatuses in the related art, whether communication apparatuses are replaceable with predefined conditions being met.

In view of the aforementioned circumstances, an object of the present disclosure is to provide a replacement management apparatus, a replacement management method, and a program capable of determining whether communication apparatuses are replaceable with predefined conditions being met.

Means for Solving the Problem

According to an aspect of the present disclosure, there is provided a replacement management apparatus including a detection unit configured to detect, for both a communication apparatus to be replaced and a communication apparatus for replacement, communication speeds of physical ports used for connection, in units of communication apparatuses that are connection destinations, and a replacement determination unit configured to derive, for both the communication apparatus to be replaced and the communication apparatus for replacement, a communication capacity that is a sum of the communication speeds, for each of the communication apparatuses that are connection destinations, and determine, for all of the communication apparatuses that are connection destinations, in a case in which the communication capacity of the communication apparatus for replacement is equal to or greater than the communication capacity of the communication apparatus to be replaced, that the communication apparatus to be replaced is replaceable with the communication apparatus for replacement.

Effects of the Invention

According to the present disclosure, it is possible to determine whether communication apparatuses are replaceable with predefined conditions being met.

BRIEF DESCRIPTION OF DRAWINGS

FIG. 4 is a diagram illustrating an example of topology information before update according to the first embodiment.

FIG. 5 is a diagram illustrating an example of topology information after the update according to the first embodiment.

FIG. 6 is a diagram illustrating an example of apparatus information before update according to the first embodiment.

FIG. 7 is a diagram illustrating an example of apparatus information after the update according to the first embodiment.

DESCRIPTION OF EMBODIMENTS

Embodiments of the present disclosure will be described in detail with reference to the drawings.

First Embodiment

Figure 1:
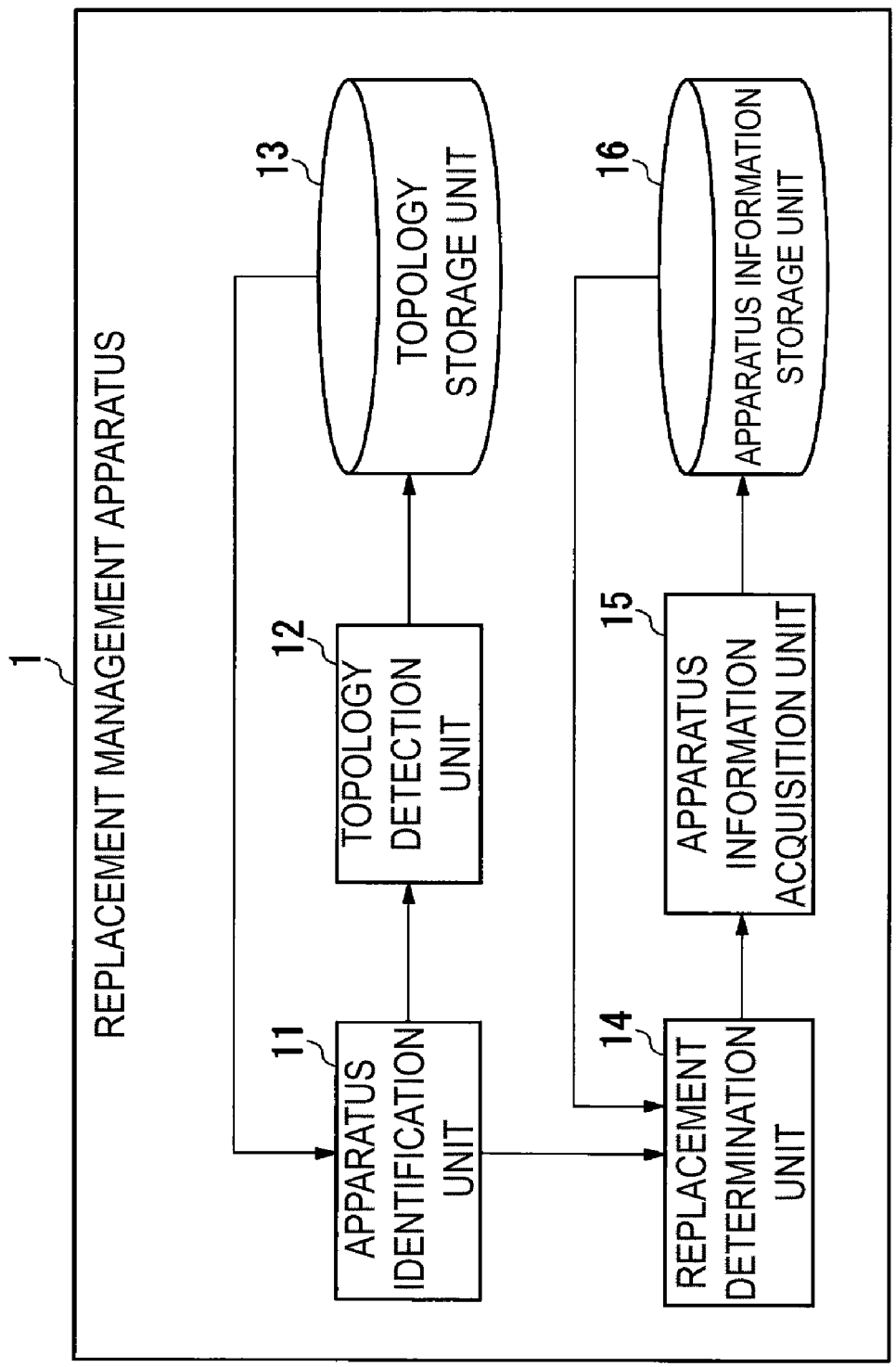
FIG. 1 is a diagram illustrating a configuration example of a replacement management apparatus according to a first embodiment.

FIG. 1 is a diagram illustrating a configuration example of a replacement management apparatus 1. The replacement management apparatus 1 is an information processing apparatus that manages replacement of communication apparatuses. The replacement management apparatus 1 determines a replacement pattern between a communication apparatus to be replaced and a communication apparatus for replacement in accordance with a wiring of cables between the communication apparatuses.

As replacement patterns, there are replacement (first pattern) of the communication apparatus after a failure (a state in which communication is not possible) of the communication apparatus to be replaced, replacement (second pattern) of the communication apparatus before a failure (a state in which communication is possible) of the communication apparatus to be replaced, and a pattern (third pattern) in which information (an identifier of the communication apparatus for replacement) related to the replacement of the communication apparatus is incorrectly entered, for example. The information regarding the replacement of the communication apparatuses is entered to the replacement management apparatus 1 by an operator.

The replacement management apparatus 1 determines whether the communication apparatuses are replaceable with predefined conditions being met. The predefined conditions are, for example, a condition regarding the number of cables and a condition regarding communication capacity.

The replacement management apparatus 1 includes an apparatus identification unit 11, a topology detection unit 12, a topology storage unit 13, a replacement determination unit 14, an apparatus information acquisition unit 15, and an apparatus information storage unit 16.

Figure 2:
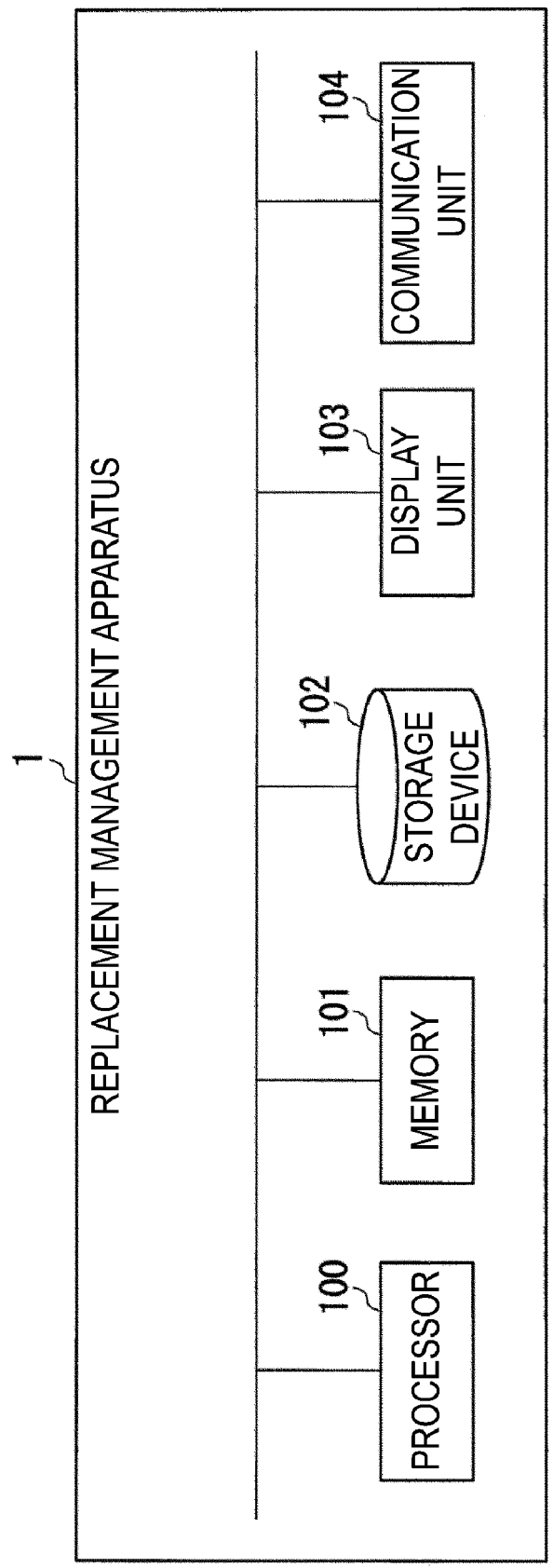
FIG. 2 is a diagram illustrating a configuration example of hardware of the replacement management apparatus according to the first embodiment.

FIG. 2 is a diagram illustrating an example of a hardware configuration of the replacement management apparatus 1. The replacement management apparatus 1 includes a processor 100, a memory 101, a storage device 102, a display unit 103, and a communication unit 104.

Each of the functional units (the apparatus identification unit 11, the topology detection unit 12, the replacement determination unit 14, and the apparatus information acquisition unit 15) illustrated in FIG. 1 is implemented as software by the processor 100 such as a central processing unit (CPU) executing a program loaded into the memory 101 from the storage device 102 that is a nonvolatile recording medium (non-transitory recording medium).

The topology storage unit 13 and the apparatus information storage unit 16 illustrated in FIG. 1 are implemented using the storage device 102, for example. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 102 including a hard disk incorporated in a computer system. The program may be transmitted via an electrical communication line.

A part or an entirety of the replacement management apparatus 1 may be implemented using hardware including an electronic circuit (or circuitry) using, for example, a large scale integration circuit (LSI), an application specific integrated circuit (ASIC), a programmable logic device (PLD), or a field programmable gate array (FPGA). The display unit 103 is, for example, a liquid crystal display.

The communication unit 104 executes, for example, wireless communication.

Figure 3:
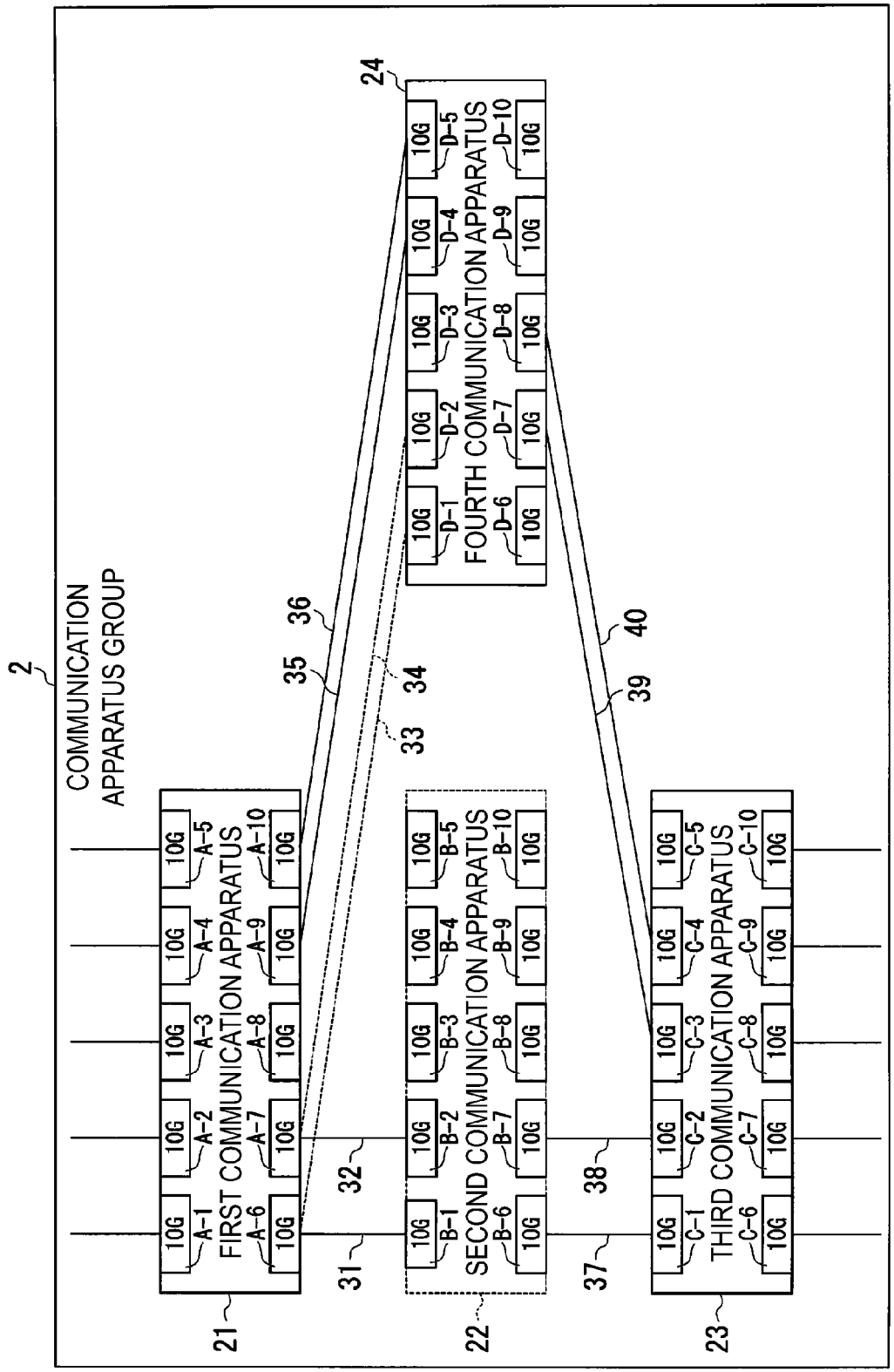
FIG. 3 is a diagram illustrating an example of replacement of a communication apparatus according to the first embodiment.

FIG. 3 is a diagram illustrating an example of replacement of communication apparatuses. As an example, a communication apparatus group 2 includes a first communication apparatus 21, a second communication apparatus 22, a third communication apparatus 23, and a fourth communication apparatus 24. The communication apparatus group 2 is a communication apparatus group managed by the replacement management apparatus 1. The communication apparatuses in the communication apparatus group 2 are relay apparatuses configuring a network and are, for example, switches or routers. The communication apparatus group 2 may be connected directly to the replacement management apparatus 1 or may be connected to the replacement management apparatus 1 via a communication line.

The second communication apparatus 22 is connected to the first communication apparatus 21 using a cable 31 and a cable 32. The second communication apparatus 22 is connected to the third communication apparatus 23 using a cable 37 and a cable 38.

In FIG. 3, the communication capacity of the second communication apparatus 22 is the same as the communication capacity of the fourth communication apparatus 24. The communication speed of each port of the second communication apparatus 22 is 10 Gbps as an example. The communication speed of each port of the fourth communication apparatus 24 is 10 Gbps as an example.

In FIG. 3, the second communication apparatus 22 to be replaced has caused a failure. The second communication apparatus 22 to be replaced is replaced with the fourth communication apparatus 24 for replacement. In a case in which the second communication apparatus 22 to be replaced is replaced with the fourth communication apparatus 24 for replacement, the fourth communication apparatus 24 is connected to the first communication apparatus 21 by the operator. The fourth communication apparatus 24 is connected to the third communication apparatus 23 by the operator.

The operator may connect the ports ("A-6 and D-1" and "A-7 and D-2") of the first communication apparatus 21 and the fourth communication apparatus 24 using the cable 31 and the cable 32 like a cable 33 and a cable 34. The operator may connect each port ("A-9 and D-4" and "A-10 and D-5") of the first communication apparatus 21 and the fourth communication apparatus 24 using two newly provided cables other than the cable 31 and the cable 32 like a cable 35 and a cable 36.

Similarly, the operator may connect the third communication apparatus 23 and the fourth communication apparatus 24 using a cable 37 and a cable 38. The operator may connect predetermined ports of the third communication apparatus 23 and the fourth communication apparatus 24 using two newly provided cables other than the cable 37 and the cable 38 like a cable 39 and a cable 40.

The replacement management apparatus 1 detects, in regard to the wirings of the cables connected by the operator, a topology (wirings of cables between communication apparatuses) of the network of the communication apparatus group 2. The replacement management apparatus 1 detects, in regard to the wirings of the cables connected by the operator, communication speed of each port (physical port) of the second communication apparatus 22 to be replaced and the fourth communication apparatus 24 for replacement. The replacement management apparatus 1 determines whether the communication speeds of all of the ports are the same between the second communication apparatus 22 to be replaced and the fourth communication apparatus 24 for replacement.

In a case in which the communication speeds of all of the ports are the same between the second communication apparatus 22 to be replaced and the fourth communication apparatus 24 for replacement, the replacement management apparatus 1 determines whether the second communication apparatus 22 to be replaced is replaceable with the fourth communication apparatus 24 for replacement with the same number of cables before and after the replacement. In this manner, the replacement management apparatus 1 determines whether the second communication apparatus 22 to be replaced after causing a failure is replaceable with the fourth communication apparatus 24 for replacement based on the topology (wirings of the cables between the communication apparatuses) of the network of the communication apparatus group 2.

In a case in which communication speeds of any of the ports are different between the second communication apparatus 22 to be replaced and the fourth communication apparatus 24 for replacement, the replacement management apparatus 1 derives a sum of communication speeds of the ports before the replacement between the first communication apparatus 21 and the second communication apparatus 22. The replacement management apparatus 1 derives a sum of communication speeds of the ports before the replacement between the third communication apparatus 23 and the second communication apparatus 22. The replacement management apparatus 1 derives a sum of communication speeds of the ports after the replacement between the first communication apparatus 21 and the fourth communication apparatus 24. The replacement management apparatus 1 derives a sum of communication speeds of the ports after the replacement between the third communication apparatus 23 and the fourth communication apparatus 24.

The replacement management apparatus 1 compares the sums (communication capacities) of the communication speeds of the ports before and after the replacement. In a case in which the sum of the communication speeds of the ports after the replacement is equal to or greater than the sum of the communication speeds before the replacement, the replacement management apparatus 1 determines that the second communication apparatus 22 is replaceable with the fourth communication apparatus 24. In this manner, the replacement management apparatus 1 determines whether the second communication apparatus 22 to be replaced before causing a failure (a state in which communication is possible) is replaceable with the fourth communication apparatus 24 for replacement, based on the topology of the network of the communication apparatus group 2.

Next, details of the replacement management apparatus 1 will be described. The apparatus identification unit 11 acquires, from the topology storage unit 13, topology information (topology database) of the network of the communication apparatus group 2 before the replacement. The apparatus identification unit 11 acquires, from the topology storage unit 13, topology information of the network of the communication apparatus group 2 after the replacement. The apparatus identification unit 11 determines a replacement pattern based on the topology information before update (before connection of the connection destination) and the topology information after the update (after connection of the connection destination). The apparatus identification unit 11 outputs a result of determining the replacement pattern to the replacement determination unit 14.

The topology information includes an identifier of each communication apparatus. The identifier of each communication apparatus is, for example, a unique identification number, an Internet protocol (IP) address, or an identification number that an operator associates with the communication apparatus in the topology information. The identifier of each communication apparatus is entered to the topology storage unit 13 via the topology detection unit 12 by the operator.

The topology detection unit 12 detects a topology of the network of the communication apparatus group 2 based on the identifier of each communication apparatus. The topology detection unit 12 records, in the topology storage unit 13, the topology information representing the topology of the network of the communication apparatus group 2. For example, the topology detection unit 12 records the topology information in the topology storage unit 13 at a timing of replacement of communication apparatuses (communication devices), a timing at which the operator detects the topology, or the like. The topology storage unit 13 stores the topology information of the network of the communication apparatus group 2.

FIG. 4 is a diagram illustrating an example of topology information before the update "DB-t1". In the topology information, identifiers of the communication apparatuses, port numbers (physical port numbers) of the communication apparatuses, identifiers of different communication apparatuses (hereinafter, referred to as "apparatuses that are connection destinations") connected to the communication apparatuses, and port numbers of the apparatuses that are connection destinations are associated with each other.

FIG. 5 is a diagram illustrating an example of topology information after the update "Db-t2". In the topology information after the update, data related to the second communication apparatus 22 to be replaced has been deleted as compared with the topology information before the update. In the topology information after the update, data related to the fourth communication apparatus 24 for replacement has been added as compared with the topology information before the update.

The replacement determination unit 14 acquires the result of determining the replacement pattern from the apparatus identification unit 11. The replacement determination unit 14 acquires information related to the communication apparatuses (hereinafter, referred to as "apparatus information") from the apparatus information storage unit 16. The apparatus information is, for example, a database representing a communication speed of each port.

The replacement determination unit 14 may acquire apparatus information including setting information of the communication apparatuses. The setting information of the communication apparatuses is, for example, port setting and routing setting. The port setting is, for example, an identifier of a virtual local area network (virtual LAN ID). The routing setting is, for example, a port number of a gateway and an IP address of a transfer destination (destination). For example, the operator registers the setting information of the communication apparatuses in the apparatus information in advance in accordance with a specification of the communication apparatus group 2 (network).

The replacement determination unit 14 derives, for each apparatus that is a connection destination, communication capacities for the communication apparatus to be replaced and the communication apparatus for replacement. In a case in which the communication capacity of the communication apparatus for replacement is equal to or greater than the communication capacity of the communication apparatus to be replaced for all of the apparatuses that are connection destinations, the replacement determination unit 14 determines that the communication apparatus to be replaced is replaceable with the communication apparatus for replacement.

The apparatus information acquisition unit 15 (detection unit) detects the apparatus information (for example, the communication speeds of the physical ports) of each of the communication apparatuses in the communication apparatus group 2 using, for example, a simple network management protocol (SNMP). The apparatus information acquisition unit 15 updates the apparatus information based on the detection result. The apparatus information acquisition unit 15 records the apparatus information after the update in the apparatus information storage unit 16. The apparatus information storage unit 16 stores the apparatus information.

FIG. 6 is a diagram illustrating an example of apparatus information before the update "DB-c1". In the apparatus information, the identifiers of the communication apparatuses, the port numbers of the communication apparatuses, and the communication speeds (physical communication speeds) of the ports are associated with each other.

FIG. 7 is a diagram illustrating an example of apparatus information after the update "DB-c2". In the apparatus information after the update, data related to the second communication apparatus 22 to be replaced has been deleted as compared with the apparatus information before the update. The port of the first communication apparatus 21 that has been connected to the second communication apparatus 22 to be replaced does not link up. The port of the third communication apparatus 23 that has been connected to the second communication apparatus 22 to be replaced does not link up. Information regarding each of the ports that do not link up is deleted from the apparatus information.

In the apparatus information after the update, data related to the fourth communication apparatus 24 for replacement has been added as compared with the apparatus information before the update. The port of the first communication apparatus 21 connected to the fourth communication apparatus 24 for replacement has linked up. The port of the third communication apparatus 23 connected to the fourth communication apparatus 24 for replacement has linked up. Information regarding each of the ports that have linked up is added to the apparatus information.

Next, an example of an operation procedure of the replacement management apparatus 1 will be described.

Figure 8:
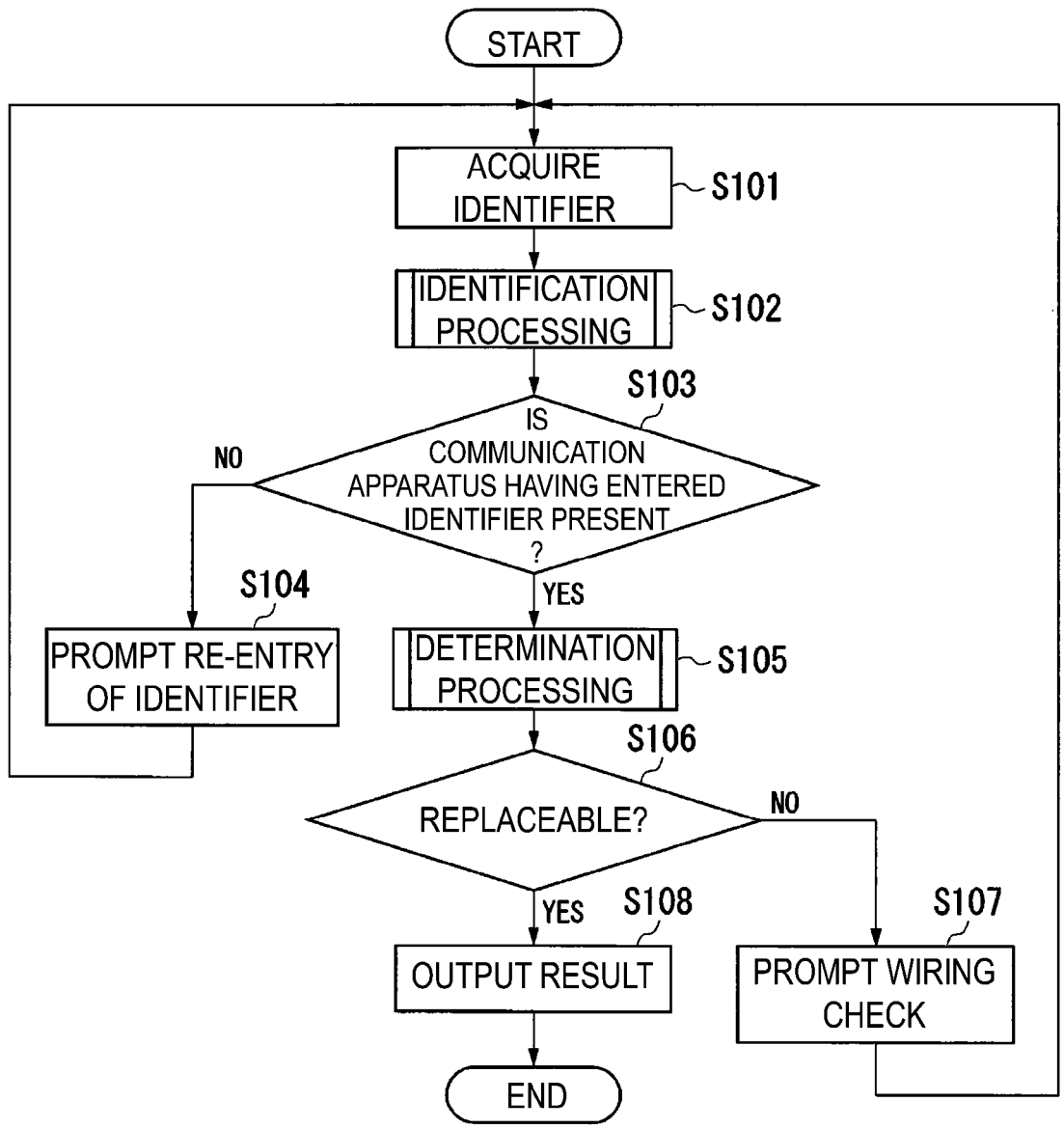
FIG. 8 is a flowchart illustrating an example of an operation procedure of the replacement management apparatus according to the first embodiment.

FIG. 8 is a flowchart illustrating an example of an operation procedure of the replacement management apparatus 1. The operator has completed connection of cables. The apparatus identification unit 11 acquires the identifier of the second communication apparatus 22 to be replaced and the identifier of the fourth communication apparatus 24 for replacement from the operator (Step S101).

The apparatus identification unit 11 executes processing of identifying the communication apparatuses in the communication apparatus group 2. The topology detection unit 12 detects the topology of the network of the communication apparatus group 2 based on the result of detecting the identifiers of the communication apparatuses (Step S102).

The apparatus identification unit 11 determines whether a communication apparatus having an entered identifier is present in the communication apparatus group 2 based on the result of the identification processing (Step S103).

In a case in which the communication apparatus having the entered identifier is not present in the communication apparatus group 2 (Step S103: NO), there is a probability that the entered identifier is incorrect. Thus, the apparatus identification unit 11 prompts for a re-entry of the identifier to the operator. For example, the apparatus identification unit 11 causes the display unit 103 to display a character sequence "Please check an entered extension." to encourage the operator to re-enter the identifier. The apparatus identification unit 11 discards the topology information after the update stored in the topology storage unit 13 (Step S104). The apparatus identification unit 11 returns the processing to Step S101.

In a case in which the communication apparatus having an entered identifier is present in the communication apparatus group 2 (Step S103: YES), the apparatus identification unit 11 determines a replacement pattern (which of replacement after a failure or replacement before a failure the replacement corresponds to). The replacement determination unit 14 acquires the replacement pattern from the apparatus identification unit 11. The replacement determination unit 14 detects the apparatus information in the current communication apparatus group 2.

The replacement determination unit 14 executes determination processing based on the replacement pattern and the apparatus information. In other words, the replacement determination unit 14 determines whether replacement can be achieved with a predetermined condition met in a case in which the second communication apparatus 22 "S1" is replaced with the fourth communication apparatus 24 "S2", based on the replacement pattern and the apparatus information (Step S105). The replacement determination unit 14 determines whether replacement is determined to be able to be achieved (Step S106).

In a case in which the replacement is determined not to be able to be replaced (Step S106: NO), it is necessary to change a wiring of the cables such that the replacement can be achieved. Thus, the replacement determination unit 14 prompts for wiring check to the operator. For example, the replacement determination unit 14 causes the display unit 103 to display a character sequence "Please check the wiring." to encourage the operator to check the physical wiring. The replacement determination unit 14 causes the display unit 103 to display information indicating that replacement cannot be achieved. The replacement determination unit 14 discards the apparatus information after the update stored in the apparatus information storage unit 16 (Step S107).

The replacement determination unit 14 returns the processing to Step S101. In a case in which the replacement is determined to be able to be achieved (Step S106: YES), the replacement determination unit 14 causes the display unit 103 to display information indicating that replacement can be achieved (Step S108).

Figure 9:
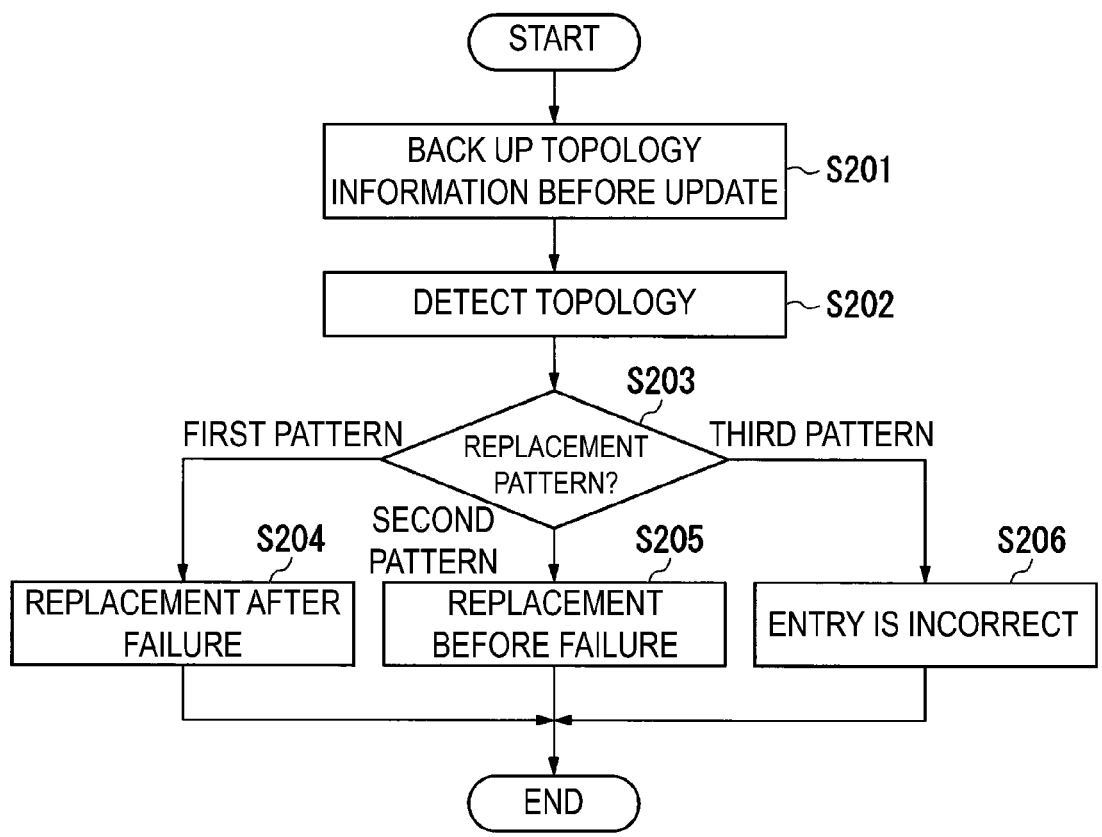
FIG. 9 is a flowchart illustrating an example of an operation procedure of an apparatus identification unit and the like according to the first embodiment.

FIG. 9 is a flowchart illustrating an example of an operation procedure (identification processing) of the apparatus identification unit 11 and the like. The flowchart illustrated in FIG. 9 is details of Step S102 illustrated in FIG. 8. The apparatus identification unit 11 backs up the topology information before the update. The apparatus identification unit 11 records the topology information before the update in the memory 101, for example (Step S201).

The topology detection unit 12 detects the topology of the network of the communication apparatus group 2. For example, the topology detection unit 12 transmits a link layer discovery protocol (LLDP) packet to each communication apparatus. The topology detection unit 12 acquires a response signal from each communication apparatus. The topology detection unit 12 can thus collect the port numbers and the like of the apparatuses that are connection destinations (Step S202).

The apparatus identification unit 11 determines the replacement pattern based on the topology information before the update and the topology information after the update (Step S203). In a case in which the second communication apparatus 22 "S1" has not been registered in the topology information after the update "DB-t2", the second communication apparatus 22 "S1" has been registered in the topology information before the update "DB-t1", and the fourth communication apparatus 24 "S2" has been registered in the topology information after the update "DB-t2" (Step S203: first pattern), the apparatus identification unit 11 determines that the pattern is that the second communication apparatus 22 after causing a failure is replaced with the fourth communication apparatus 24 (Step S204).

In a case in which the second communication apparatus 22 "S1" and the fourth communication apparatus 24 "S2" have been registered in the topology information after the update "DB-t2" (Step S203: second pattern), the apparatus identification unit 11 determines that the pattern is that the second communication apparatus 22 before causing a failure (in a state in which communication is possible) is replaced with the fourth communication apparatus 24 (Step S205).

In a case in which the replacement pattern is neither the first pattern nor the second pattern, that is, in a case in which the fourth communication apparatus 24 "S2" has not been registered in the topology information after the update "DB-t2" (Step S203: third pattern), the apparatus identification unit 11 determines that the entry of the identifier from the operator is incorrect (Step S205).

Figure 10:
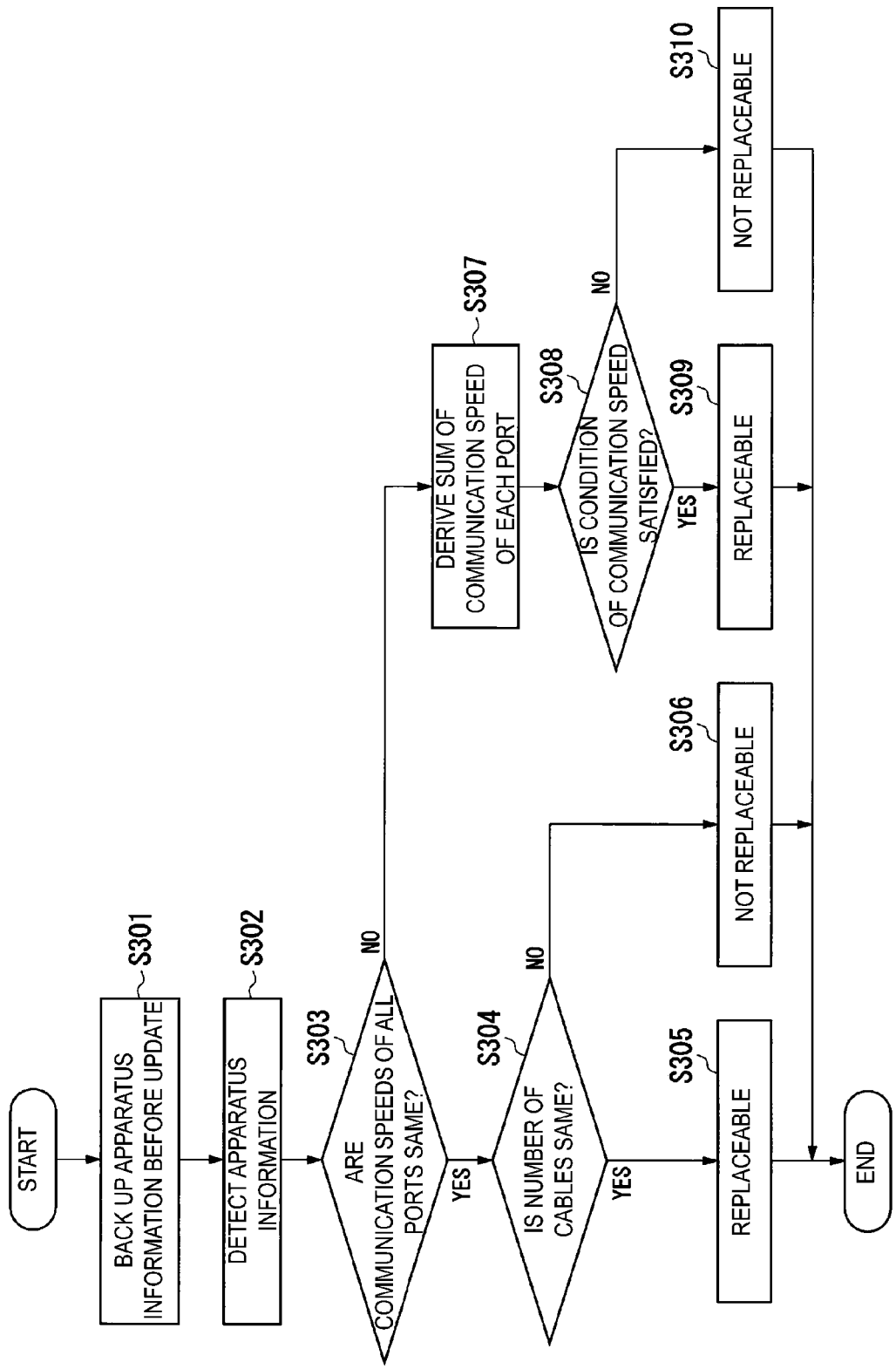
FIG. 10 is a flowchart illustrating an example of an operation procedure of a replacement determination unit and the like according to the first embodiment.

FIG. 10 is a flowchart illustrating an example of an operation procedure of the replacement determination unit 14 and the like. The flowchart illustrated in FIG. 10 is details of Step S105 illustrated in FIG. 8. The replacement determination unit 14 backs up the apparatus information before the update. The replacement determination unit 14 records the apparatus information before the update in the memory 101, for example (Step S301). The apparatus information acquisition unit 15 detects the apparatus information of each communication apparatus in the communication apparatus group 2. The apparatus information acquisition unit 15 updates the apparatus information based on the detection result (Step S302).

The replacement determination unit 14 acquires, from the apparatus information after the update, information regarding the communication speed of each port of the fourth communication apparatus 24 having the identifier designated by the operator. In other words, the replacement determination unit 14 acquires, from the apparatus information after the update, information regarding the communication speed of each port of the fourth communication apparatus 24 for replacement. The replacement determination unit 14 acquires the information regarding the communication speed of each port of the second communication apparatus 22 from the apparatus information before the update (the apparatus information backed up). The replacement determination unit 14 determines whether the communication speeds of all of the ports of the second communication apparatus 22 are the same as the communication speeds of all of the ports of the fourth communication apparatus 24 (Step S303).

In a case in which the communication speeds of all of the ports are the same between the second communication apparatus 22 to be replaced and the fourth communication apparatus 24 for replacement (Step S303: YES), the replacement determination unit 14 determines whether the number of cables before the replacement is the same as the number of cables after the replacement. In other words, whether the number of cables connected from the first communication apparatus 21 (the apparatus that is a connection destination) to the second communication apparatus 22 to be replaced is the same as the number of cables connected from the first communication apparatus 21 to the fourth communication apparatus 24 for replacement is determined. The replacement determination unit 14 determines whether the number of cables connected from the third communication apparatus 23 (the apparatus that is a connection destination) to the second communication apparatus 22 to be replaced is the same as the number of cables connected from the third communication apparatus 23 to the fourth communication apparatus 24 for replacement (Step S304).

In a case in which the number of cables before the replacement is the same as the number of cables after the replacement (Step S304: YES), the replacement determination unit 14 determines that replacement can be achieved between the communication apparatuses having the same communication capacities with the condition that the number of cables before the replacement and the number of cables after the replacement are the same and the condition that the communication capacity after the replacement is equal to or greater than the communication capacity before the replacement met (Step S305).

In a case in which the number of cables before the replacement is different from the number of cables after the replacement (Step S304: NO), the condition that the number of cables before the replacement and the number of cables after the replacement are the same is not met, and the replacement determination unit 14 thus determines that replacement cannot be achieved between the communication apparatuses having the same communication capacities (Step S306). Note that the replacement determination unit 14 may determine that the replacement can be achieved between the communication apparatuses with the condition that the communication capacity after the replacement is equal to or greater than the communication capacity before the replacement met.

In a case in which the communication speeds of any of the ports are different between the second communication apparatus 22 to be replaced and the fourth communication apparatus 24 for replacement (Step S303: NO), the replacement determination unit 14 derives a sum "R1A" of communication speeds of the ports before the replacement between the first communication apparatus 21 (port number "A") and the second communication apparatus 22 based on the apparatus information. The replacement management apparatus 1 drives a sum "R1C" of the communication speeds of the ports before the replacement between the third communication apparatus 23 (port number "C") and the second communication apparatus 22 based on the apparatus information.

The replacement determination unit 14 derives a sum "R2A" of the communication speeds of the ports after the replacement between the first communication apparatus 21 (port number "A") and the fourth communication apparatus 24 based on the apparatus information. For example, the replacement determination unit 14 derives the sum "R2A" of the communication speeds of the ports after the replacement as "20 Gbps" which is the sum of "10 Gbps" at the port number "D-4" and "10 Gbps" at the port number "D-5". The replacement determination unit 14 derives the sum "R2C" of the communication speeds of the ports after the replacement between the third communication apparatus 23 (port number "C") and the fourth communication apparatus 24 based on the apparatus information.

The replacement determination unit 14 determines whether the condition of the communication speeds is met. In other words, the replacement determination unit 14 compares the sums (communication capacities) of the communication speeds of the ports before and after the replacement. In a case in which the sum of the communication speeds of the ports after the replacement is equal to or greater than the sum of the communication speeds before the replacement, the replacement determination unit 14 determines that the second communication apparatus 22 is replaceable with the fourth communication apparatus 24.

In a case in which "R2A≥R1A" and "R2C≥R1C" are satisfied (S308: YES), the replacement determination unit 14 determines that replacement can be achieved between communication apparatuses having different communication capacities with the condition that the communication capacity after the replacement is equal to or greater than the communication capacity before the replacement met (Step S309).

In a case in which "R2A<R1A" or "R2C<R1C" is satisfied (S308: NO), the replacement determination unit 14 determines that replacement cannot be achieved between the communication apparatuses having different communication capacities since the condition that the communication capacity after the replacement is equal to or greater than the communication capacity before the replacement is not met (Step S310).

As described above, the replacement management apparatus 1 according to the first embodiment includes the apparatus information acquisition unit 15 (detection unit) and the replacement determination unit 14. The apparatus information acquisition unit 15 detects, for the communication apparatus to be replaced and the communication apparatus for replacement, the communication speeds of physical ports used for connection for each of the apparatuses that are connection destinations. The replacement determination unit 14 derives, for the communication apparatus to be replaced and the communication apparatus for replacement, communication capacities (sums of communication speeds) for each of the apparatuses that are connection destinations. In a case in which the communication capacity of the communication apparatus for replacement is equal to or greater than the communication capacity of the communication apparatus to be replaced for all of the apparatuses that are connection destinations, the replacement determination unit 14 determines that the communication apparatus to be replaced is replaceable with the communication apparatus for replacement.

It is thus possible to determine whether replacement can be achieved between the communication apparatuses with predefined conditions being met. Also, it is possible to eliminate efforts for trouble-shooting to handle an error in the number of cables to be connected to the communication apparatus for replacement.

Second Embodiment

A second embodiment is different from the first embodiment in that the second communication apparatus 22 before causing a failure (in a state in which communication is possible) is replaced with the fourth communication apparatus 24. In the second embodiment, differences from the first embodiment will be described.

Figure 11:
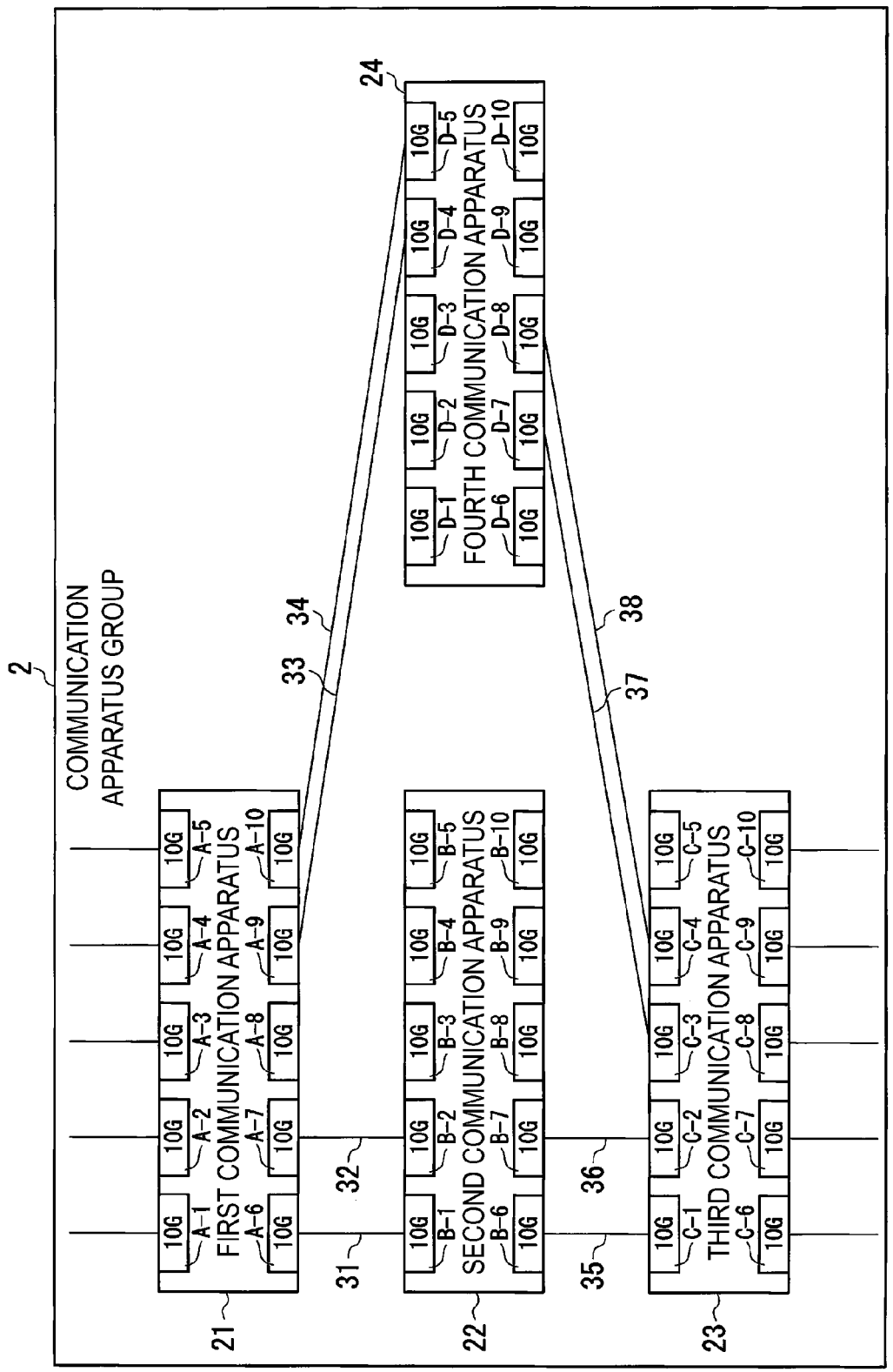
FIG. 11 is a diagram illustrating an example of replacement of a communication apparatus according to a second embodiment.

FIG. 11 is a diagram illustrating an example of replacement of communication apparatuses. A second communication apparatus 22 before causing a failure (in a state in which communication is possible) is replaced with a fourth communication apparatus 24.

In FIG. 11, the same number of cables as the number of a cable 31 and a cable 32 connected from a first communication apparatus 21, which is an apparatus that is a connection destination, to the second communication apparatus 22 are newly provided. A cable 33 and a cable 34 are newly provided cables. The first communication apparatus 21, which is the apparatus that is the connection destination, and the fourth communication apparatus 24 are connected using the cable 33 and the cable 34.

Similarly, the same number of cables as the number of a cable 35 and a cable 36 connected from a third communication apparatus 23, which is an apparatus that is a connection destination, to the second communication apparatus 22 are newly provided. A cable 37 and a cable 38 are newly provided cables. The third communication apparatus 23, which is the apparatus that is the connection destination, and the fourth communication apparatus 24 are connected using the cable 37 and the cable 38.

As described above, similarly to the first embodiment, the replacement management apparatus 1 determines a replacement pattern between the communication apparatus to be replaced and the communication apparatus for replacement in accordance with a wiring of cables between the communication apparatuses. Similar to the first embodiment, the replacement management apparatus 1 determines whether replacement can be achieved with predefined conditions being met.

In this manner, in a case in which the communication speeds of the ports of the communication apparatus to be replaced are the same as the communication speeds of the ports of the communication apparatus for replacement, the replacement management apparatus 1 can determine availability of the replacement of the communication apparatus to be replaced before causing a failure with the communication apparatus for replacement.

Third Embodiment

A third embodiment is different from the first embodiment in that a communication capacity of a second communication apparatus 22 to be replaced is mutually different from a communication capacity of a fourth communication apparatus 24 for replacement. In the third embodiment, differences from the first embodiment will be described.

Figure 12:
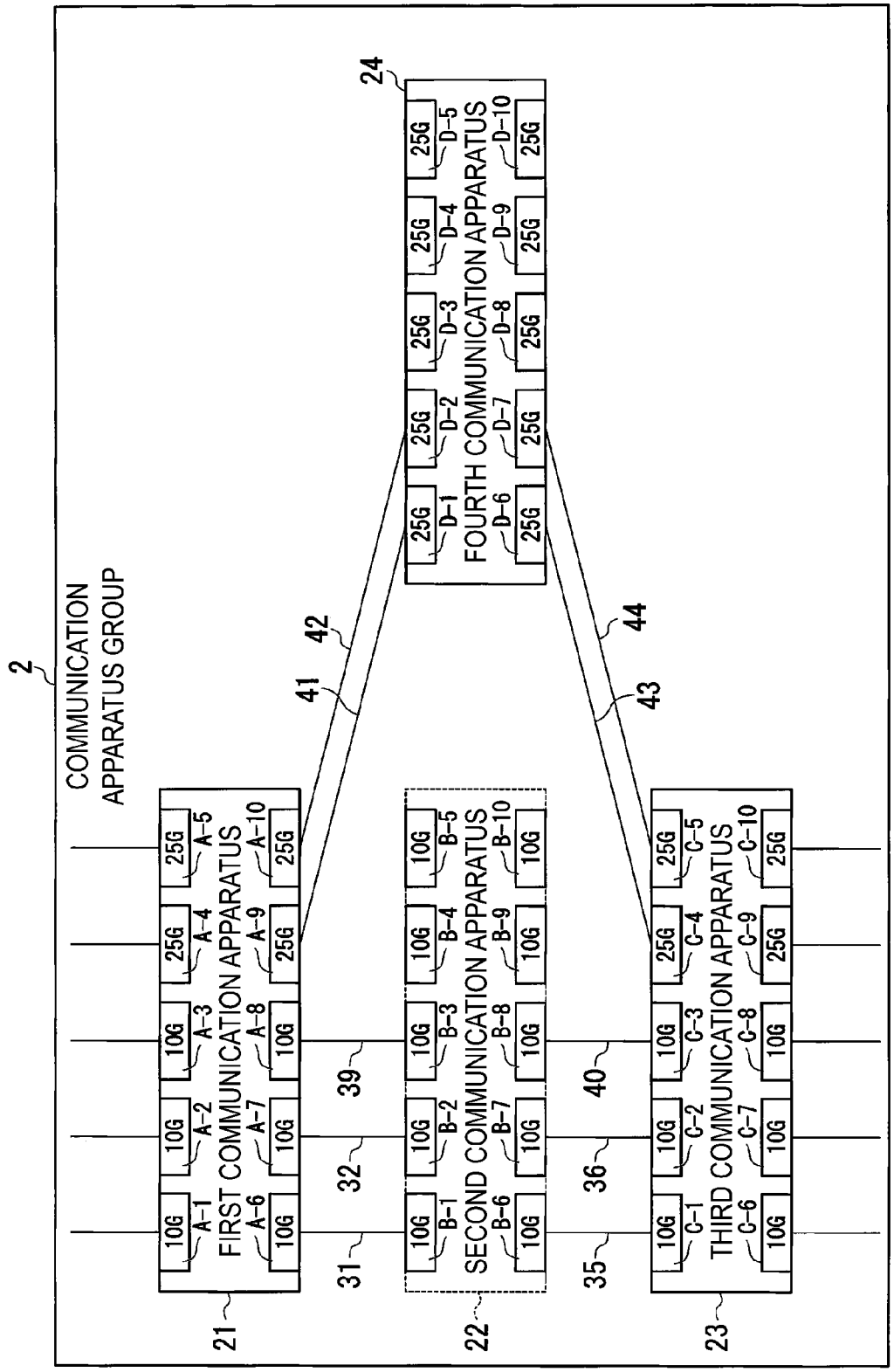
FIG. 12 is a diagram illustrating an example of replacement of a communication apparatus according to a third embodiment.

FIG. 12 is a diagram illustrating an example of replacement of communication apparatuses. The second communication apparatus 22 after causing a failure is replaced with the fourth communication apparatus 24. Communication traffic is aggregated in the fourth communication apparatus 24.

In FIG. 12, the communication capacity of the second communication apparatus 22 is smaller than the communication capacity of the fourth communication apparatus 24. The communication speed of each port of the second communication apparatus 22 is 10 Gbps as an example. The communication speed of each port of the fourth communication apparatus 24 is 25 Gbps as an example.

A first communication apparatus 21 includes a plurality of ports with different communication speeds. The communication speeds of the ports of the first communication apparatus 21 are 10 Gbps or 25 Gbps as an example. A third communication apparatus 23 includes a plurality of ports with different communication speeds. The communication speeds of the ports of the third communication apparatus 23 are 10 Gbps or 25 Gbps as an example. The ports with the communication speed of 10 Gbps are connected to the ports of the second communication apparatus 22. The ports with the communication speed of 25 Gbps are connected to the ports of the fourth communication apparatus 24.

In FIG. 12, a cable 41 and a cable 42 are newly provided cables so that the communication capacity of the fourth communication apparatus 24 for replacement is equal to or greater than a communication capacity of a cable 31, a cable 32, and a cable 39. A cable 43 and a cable 44 are newly provided cables so that the communication capacity of the fourth communication apparatus 24 for replacement is equal to or greater than a communication capacity of a cable 35, a cable 36, and a cable 40.

As described above, similarly to the first embodiment, the replacement management apparatus 1 determines a replacement pattern between the communication apparatus to be replaced and the communication apparatus for replacement in accordance with a wiring of cables between the communication apparatuses. Similar to the first embodiment, the replacement management apparatus 1 determines whether replacement can be achieved with predefined conditions being met.

In this manner, the replacement management apparatus 1 can determine availability of replacement of the communication apparatus to be replaced after causing a failure with the communication apparatus for replacement even when the communication speeds of the ports of the communication apparatus to be replaced are slower than the communication speeds of the ports of the communication apparatus for replacement.

Fourth Embodiment

A fourth embodiment is different from the third embodiment in that a second communication apparatus 22 before causing a failure is replaced with a fourth communication apparatus 24. In the fourth embodiment, differences from the third embodiment will be described.

Figure 13:
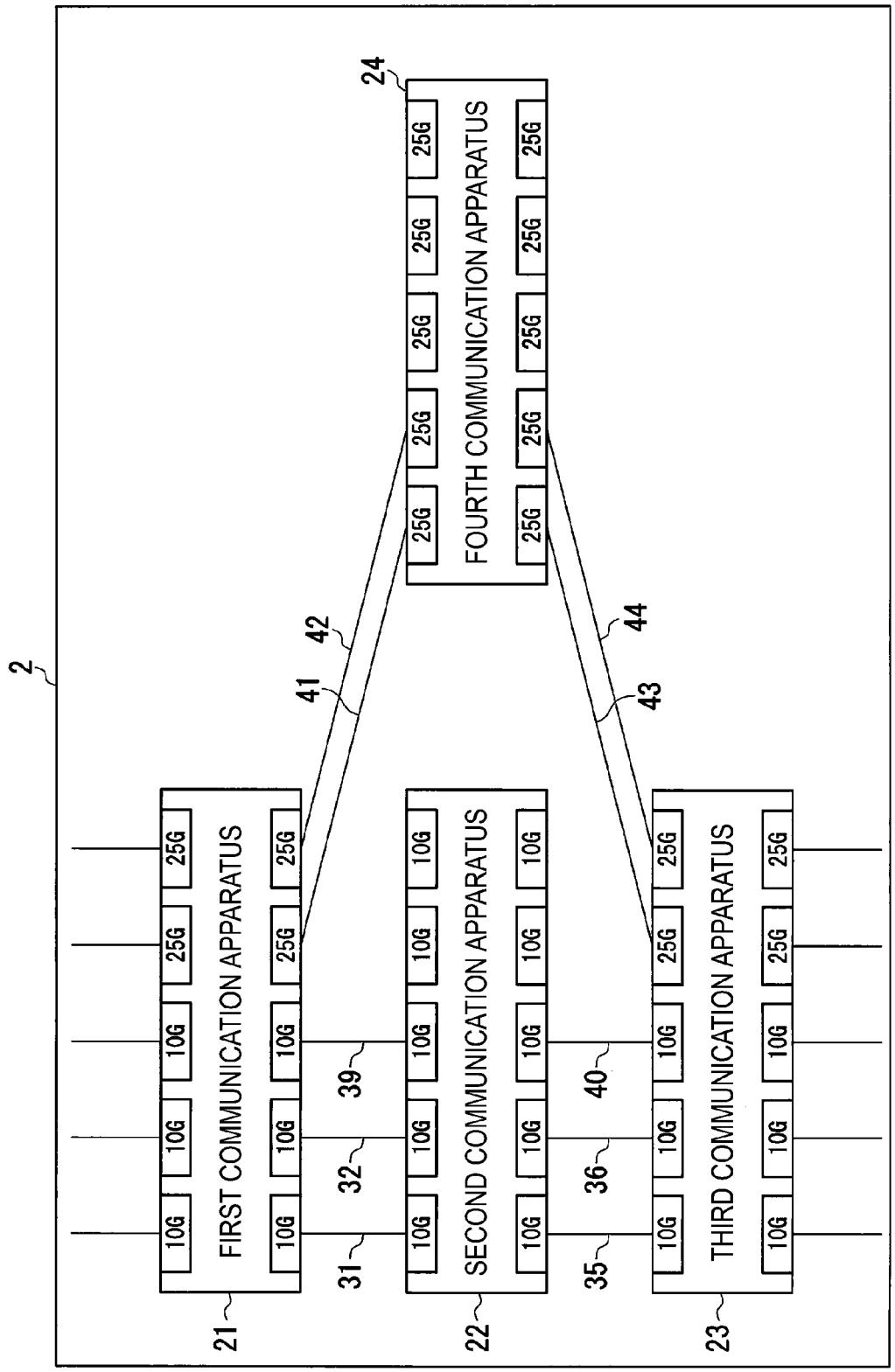
FIG. 13 is a diagram illustrating an example of replacement of a communication apparatus according to a fourth embodiment.

FIG. 13 is a diagram illustrating an example of replacement of communication apparatuses. The second communication apparatus 22 before causing a failure is replaced with the fourth communication apparatus 24. Communication traffic is aggregated in the fourth communication apparatus 24.

As described above, similarly to the first embodiment, the replacement management apparatus 1 determines a replacement pattern between the communication apparatus to be replaced and the communication apparatus for replacement in accordance with a wiring of cables between the communication apparatuses. Similar to the first embodiment, the replacement management apparatus 1 determines whether replacement can be achieved with predefined conditions being met.

In this manner, the replacement management apparatus 1 can determine availability of replacement of the communication apparatus to be replaced before causing a failure with the communication apparatus for replacement even when the communication speeds of the ports of the communication apparatus to be replaced are slower than the communication speeds of the ports of the communication apparatus for replacement.

Fifth Embodiment

A fifth embodiment is different from the third embodiment in that the communication speed of each port of a fourth communication apparatus 24 for replacement is slower than the communication speed of each port of a second communication apparatus 22 to be replaced. In the fifth embodiment, differences from the third embodiment will be described.

Figure 14:
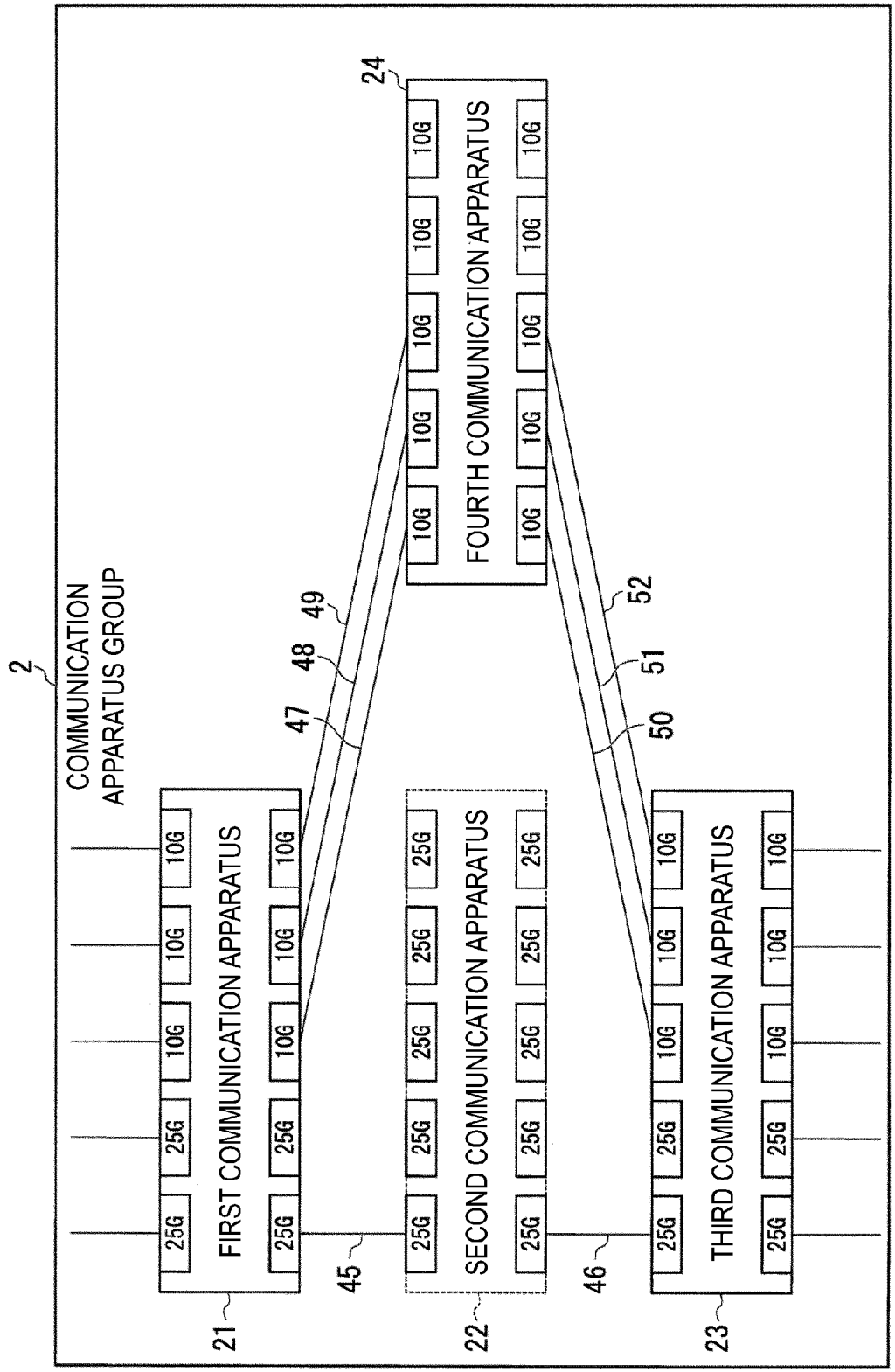
FIG. 14 is a diagram illustrating an example of replacement of a communication apparatus according to a fifth embodiment.

FIG. 14 is a diagram illustrating an example of replacement of communication apparatuses. The second communication apparatus 22 after causing a failure is replaced with the fourth communication apparatus 24. Communication traffic is disaggregated to the fourth communication apparatus 24.

In FIG. 14, the communication capacity of the second communication apparatus 22 is higher than the communication capacity of the fourth communication apparatus 24. The communication speed of each port of the second communication apparatus 22 is 25 Gbps as an example. The communication speed of each port of the fourth communication apparatus 24 is 10 Gbps as an example.

In FIG. 14, a cable 47, a cable 48, and a cable 49 are newly provided cables so that the communication capacity of the fourth communication apparatus 24 for replacement is equal to or greater than a communication capacity of a cable 45. A cable 50, a cable 51, and a cable 52 are newly provided cables so that the communication capacity of the fourth communication apparatus 24 for replacement is equal to or greater than a communication capacity of a cable 46.

As described above, similarly to the first embodiment, the replacement management apparatus 1 determines a replacement pattern between the communication apparatus to be replaced and the communication apparatus for replacement in accordance with a wiring of cables between the communication apparatuses. Similar to the first embodiment, the replacement management apparatus 1 determines whether replacement can be achieved with predefined conditions being met.

In this manner, the replacement management apparatus 1 can determine availability of replacement of the communication apparatus to be replaced after causing a failure with the communication apparatus for replacement even when the communication speed of each port of the communication apparatus to be replaced is faster than the communication speed of each port of the communication apparatus for replacement.

Sixth Embodiment

A sixth embodiment is different from the fifth embodiment in that a second communication apparatus 22 before causing a failure (in a state in which communication is possible) is replaced with a fourth communication apparatus 24. In the sixth embodiment, differences from the fifth embodiment will be described.

Figure 15:
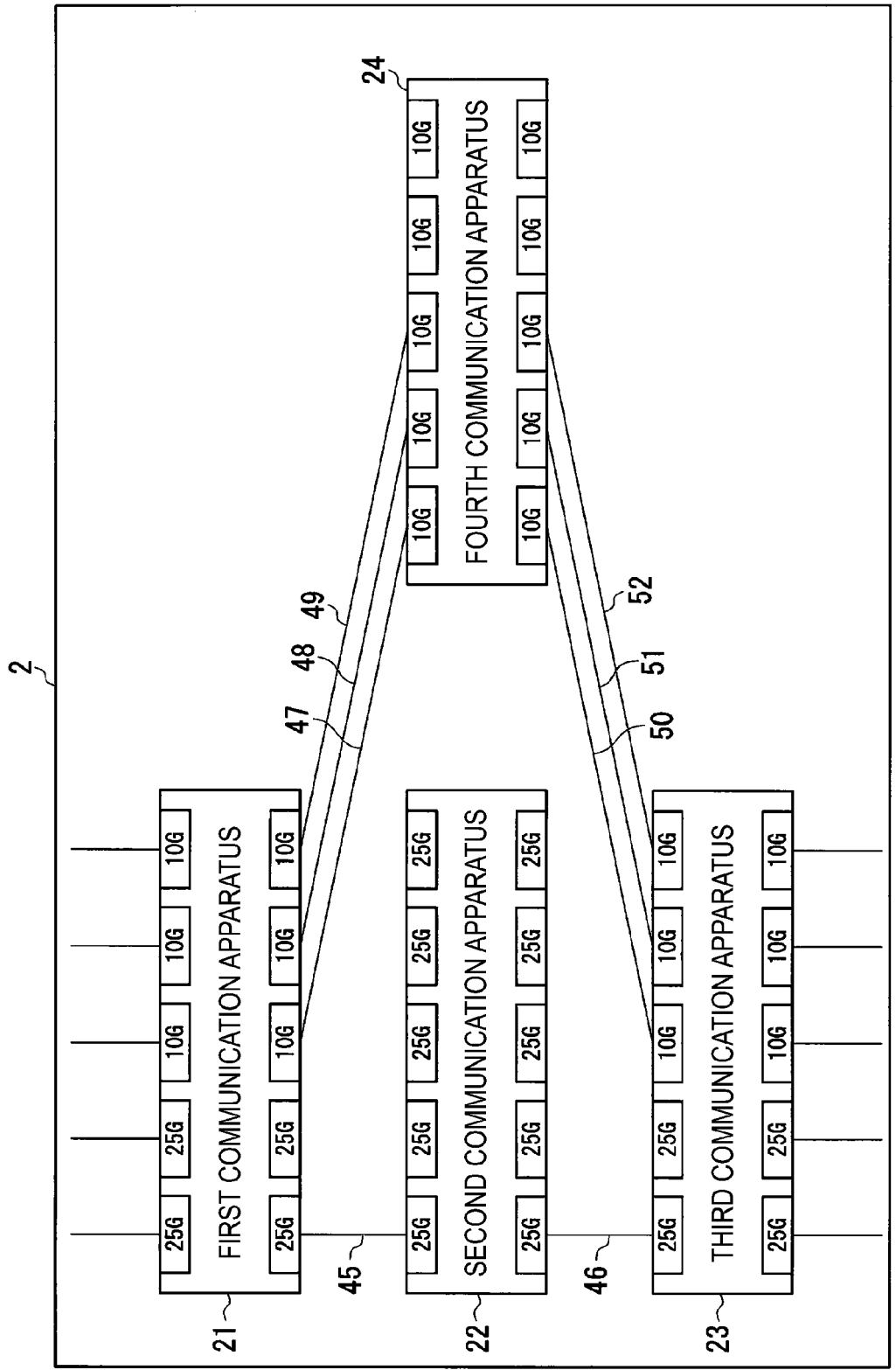
FIG. 15 is a diagram illustrating an example of replacement of a communication apparatus according to a sixth embodiment.

FIG. 15 is a diagram illustrating an example of replacement of communication apparatuses. The second communication apparatus 22 before causing a failure is replaced with the fourth communication apparatus 24. Communication traffic is disaggregated to the fourth communication apparatus 24.

As described above, similarly to the first embodiment, the replacement management apparatus 1 determines a replacement pattern between the communication apparatus to be replaced and the communication apparatus for replacement in accordance with a wiring of cables between the communication apparatuses. Similar to the first embodiment, the replacement management apparatus 1 determines whether replacement can be achieved with predefined conditions being met.

In this manner, the replacement management apparatus 1 can determine availability of replacement of the communication apparatus to be replaced before causing a failure with the communication apparatus for replacement even when the communication speed of each port of the communication apparatus to be replaced is faster than the communication speed of each port of the communication apparatus for replacement.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure can be applied to a replacement management apparatus configured to manage replacement of communication apparatuses.

REFERENCE SIGNS LIST

1 Replacement management apparatus
2 Communication apparatus group
11 Apparatus identification unit
12 Topology detection unit
13 Topology storage unit
14 Replacement determination unit
15 Apparatus information acquisition unit
16 Apparatus information storage unit
21 First communication apparatus
22 Second communication apparatus
23 Third communication apparatus
24 Fourth communication apparatus
31 to 52 Cable
100 Processor
101 Memory
102 Storage device
103 Display unit
104 Communication unit

The invention claimed is:

1. A replacement management method executed by a replacement management apparatus configured to manage replacement of communication apparatuses, the method comprising:
detecting, for both a communication apparatus to be replaced and a communication apparatus for replacement, communication speeds of physical ports used for connection, in units of communication apparatuses that are connection destinations;
deriving, for both the communication apparatus to be replaced and the communication apparatus for replacement, a communication capacity that is a sum of the communication speeds, for each of the communication apparatuses that are connection destinations, and determining, for all of the communication apparatuses that are connection destinations, in a case in which the communication capacity of the communication apparatus for replacement is equal to or greater than the communication capacity of the communication apparatus to be replaced, that the communication apparatus to be replaced is replaceable with the communication apparatus for replacement; and
replacing the communication apparatus to be replaced with the communication apparatus for replacement in response to the determination that the communication apparatus to be replaced is replaceable with the communication apparatus for replacement.

2. The method of claim 1 further comprises deriving, in a case in which the communication speeds of any of the physical ports are different between the communication apparatus to be replaced and the communication apparatus for replacement, the communication capacity for each of the communication apparatuses that are connection destinations.

3. The method of claim 2 further comprises determining, in a case in which the communication speeds of all of the physical ports of the communication apparatus to be replaced are identical with the communication speeds of all of the physical ports of the communication apparatus for replacement and a number of cables connected from the communication apparatuses that are connection destinations to the communication apparatus to be replaced is identical with the number of cables connected from the communication apparatus that are connection destinations to the communication apparatus for replacement, that the communication apparatus to be replaced is replaceable with the communication apparatus for replacement.

* * * * *